Nov. 1, 1955  F. P. SLOAN  2,722,514
WATER SOFTENING APPARATUS
Filed Oct. 6, 1950  2 Sheets-Sheet 1
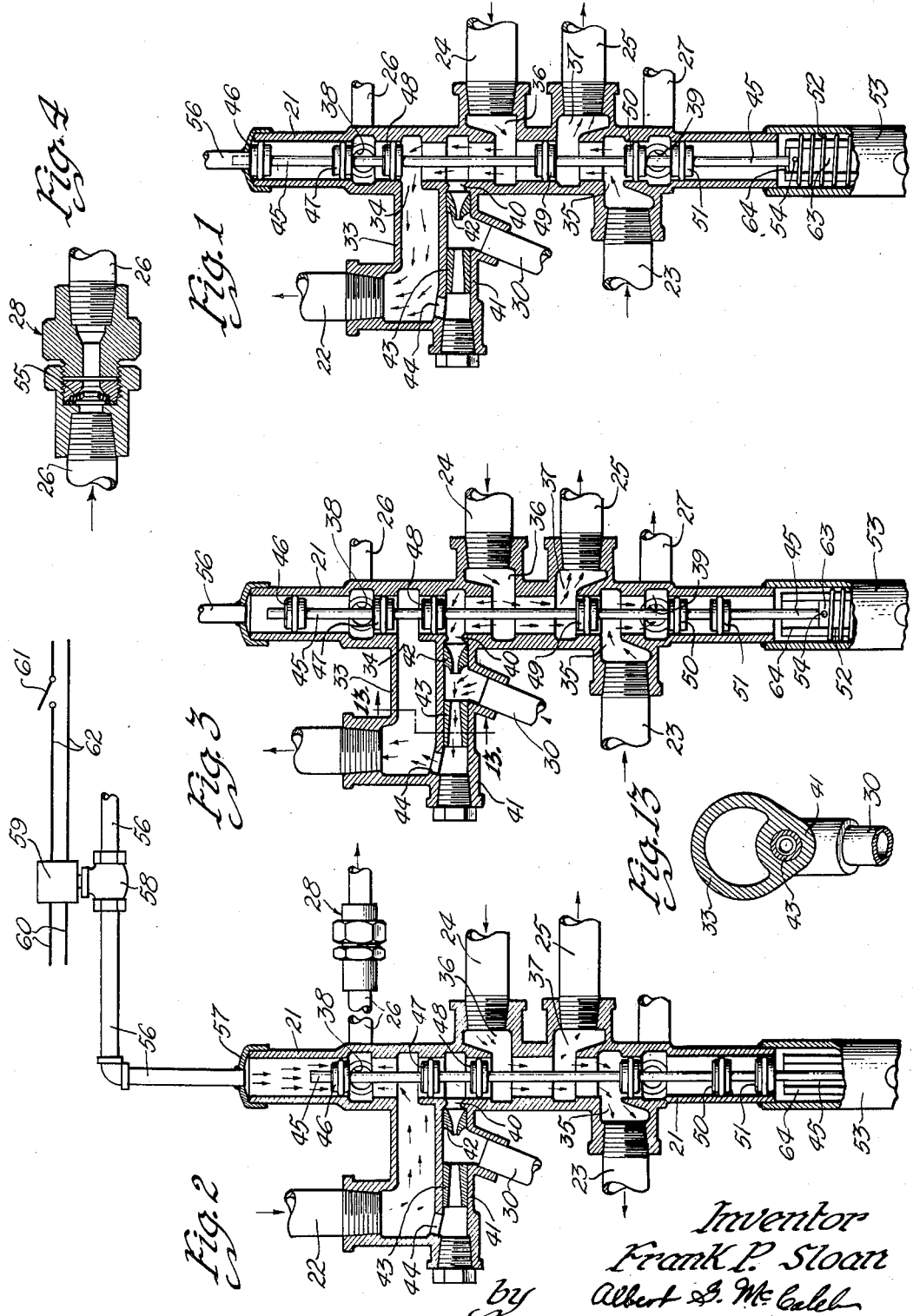
Inventor
Frank P. Sloan
by Albert G. McCaleb
Attorney

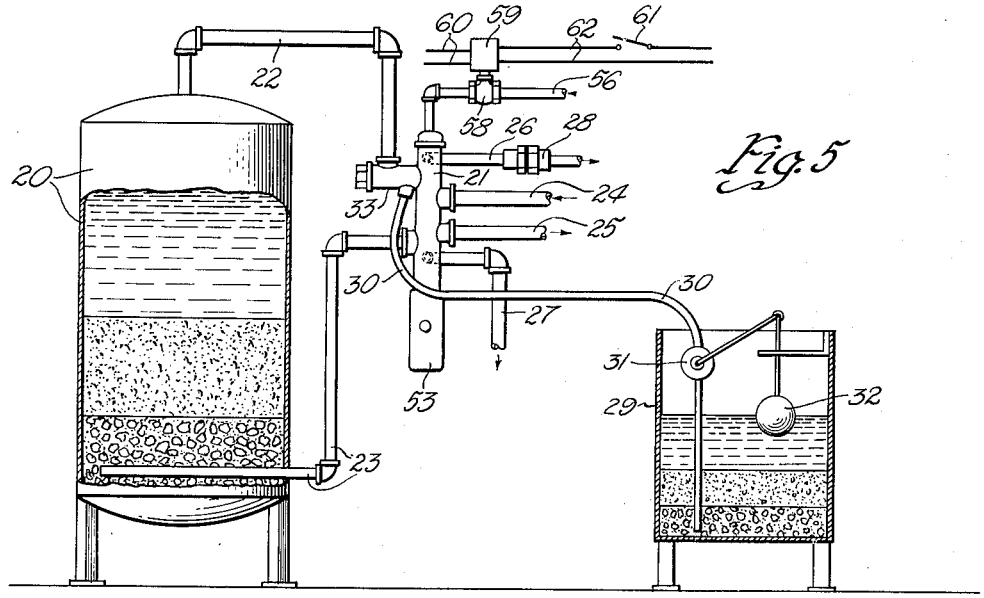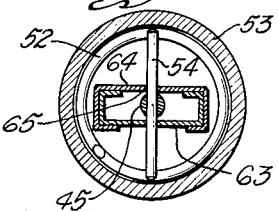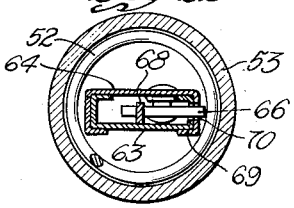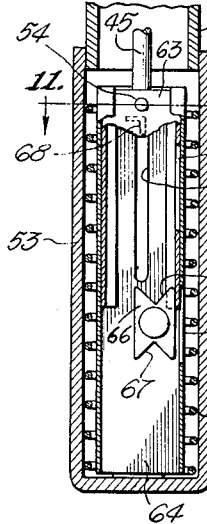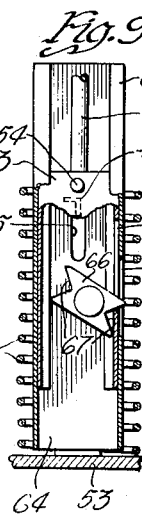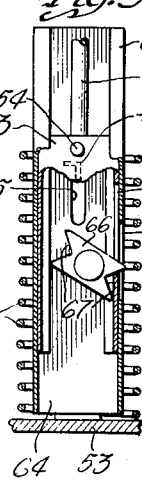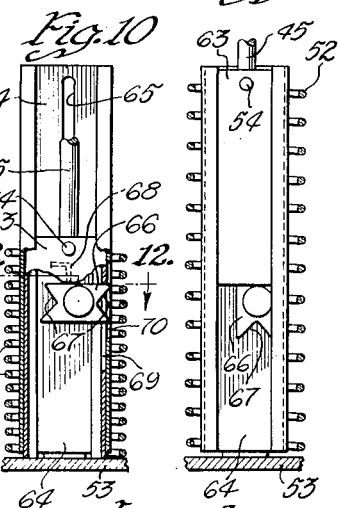

United States Patent Office 2,722,514
Patented Nov. 1, 1955

2,722,514

WATER SOFTENING APPARATUS

Frank P. Sloan, Toronto, Ontario, Canada

Application October 6, 1950, Serial No. 188,735

7 Claims. (Cl. 210—24)

This invention relates to water softening apparatus and it has for its object to provide a new and improved construction and arrangement of apparatus by the use of which highly effective and efficient water softening results may be attained under the control of a user without the necessity for exercising any high degree of skill.

It is one of the objects of my invention to provide a construction which can be produced very easily by ordinary production expedients without extensive machining operations and which will be of such strength and durability as to stand up in long continued use without the likelihood of damage to any of the parts such as might interfere with the proper operation of the apparatus.

Another of the objects of my invention is to provide for the complete control of the apparatus by a single actuating valve which may be located at any desired point relative to the softener apparatus, to put the apparatus into and out of operation for carrying out all of the steps of a regeneration operation, and to provide for the operation of such single valve or control mechanism by electrically actuated means, and if desired, such electrically actuating means also being located at any desired point.

It is another object of my invention to provide for the electrical operation of the means for regenerating the zeolite by the use of means acting automatically throughout the complete cycle of steps after the initial step by which the cycle is started.

Another of the objects of my invention is to provide an improved structure of the type specified, comprising a control valve mechanism by which the movement of brine into and out of the softener tank is regulated, in which improved structure the contact of the brine wtih the valve mechanism is kept to a minimum, so as thus to cut down the damage to the metal valve parts by the salt. This result is effected by the arrangement by which the salt solution is drawn into the softener tank by the suction effect of means such as an ejector which directs the solution to the tank without movement through the valve.

It is one of the objects of my invention to provide an improved combination of tanks, valves, connections and cooperating parts, for carrying out the desired sequence of steps involved in a water softening operation, whereby the operation may be effected with a minimum of trouble and care, at the lowest expense compatible with satisfactory results, and so as to insure a high degree of efficiency.

Other objects and advantages of the invention will be apparent from the following description and the accompanying drawings, in which similar reference characters indicate similar parts throughout the several views.

In the accompanying two sheets of drawings:

Fig. 1 is a vertical sectional view through my improved valve, with the connecting leads of piping therefrom broken away;

Figs. 2 and 3 are similar to Fig. 1 but show changed positions of the valve parts;

Fig. 4 is a central vertical sectional view through the rate of flow control means forming a part of the apparatus as shown in Fig. 2;

Fig. 5 is a diagrammatic view showing my improved valve means connected with the cooperating parts of a water softening installation;

Fig. 6 is a face view of a slide bar device, comprising a rotatably mounted detent, and connected with the valve stem for assisting in the control of the movement of said valve stem;

Figs. 7, 8, 9 and 10 are views showing different positions of the slide bar device of Fig. 6 mounted in connection with cooperating parts and shown largely in vertical section;

Fig. 11 is a horizontal sectional view taken substantially at the line 11—11 in Fig. 7;

Fig. 12 is a horizontal sectional view taken substantially at the line 12—12 in Fig. 10; and Fig. 13 is a vertical sectional view taken substantially at the line 13—13 in Fig. 3.

Referring particularly to Fig. 5 of the drawings, 20 indicates the tank of water softening apparatus with my improved valve 21 connected thereto by a pipe 22 which communicates with the upper end of the tank and a pipe 23 communicating with the tank at its lower end. An inlet pipe 24 is connected with the valve 21 for the entrance of water under pressure for softening purposes. An outlet pipe 25 is connected with said valve 21 for delivery of softened water to the system of service pipes of a residence or other building. Drain pipes 26 and 27 are connected with said valve 21, the drain pipe 26 having a rate of flow device 28 interposed therein.

The valve 21 is also connected with a brine tank 29 by a pipe 30 opening near the bottom of the tank, such pipe 30 having a double acting valve 31 connected therein so as to be controlled by a float 32 supported by the liquid in the tank. The arrangement is such that the valve 31 is normally held open by the float 32 supported on the surface of the brine in the tank 29 so as to enable a suction upwardly through the pipe 30 to cause withdrawal of brine through the pipe from the tank. When a predetermined amount of such brine has been withdrawn so as to lower the level of the brine in the tank, the float 32 and the associated parts serve to adjust said valve 31 so as to terminate the withdrawal of brine upwardly through the pipe 30.

As is clearly shown in Figs. 1, 2 and 3, the pipe 22 is connected with the valve 21 through a housing 33 covering a port 34 through which said pipe 22 communicates with the interior of the valve. The pipes 23, 24, 25, 26 and 27 open into said valve 21 directly through ports 35, 36, 37, 38 and 39 respectively. An additional port 40 opens from the valve 21 adjacent to the port 34 into a housing 41 provided with a Venturi tube member 42 therein which is adapted, by cooperation with a tubular member 43 in the housing, to exert a suction effect in the pipe 30 when water is forced outwardly from the valve 21 into said housing 41. In the construction illustrated, the housings 33 and 41 are formed integrally with each other, as shown in Fig. 13, and an opening 44 is provided in the wall common to said housings 33 and 41, so as to permit water to pass freely to the pipe 22 from the Venturi tube 42, or from the pipe 30, or from both.

Within the casing or housing of the valve 21, I have mounted a valve stem 45 provided with disk valves 46, 47, 48, 49, 50 and 51 fixed in position on the stem at spaced intervals therealong. With the stem 45 in its uppermost position, as shown in Fig. 1, in condition for a water softening operation, hard water entering the valve 21 through the pipe 24 is free to pass out through the port 34 and the pipe 22 to the upper end of the softener tank 20 above the usual bed of zeolite in the tank. This forces water out of said tank 20, from a point below the bed of zeolite, through the pipe 23 and thence through the ports 35 and 37 into the service pipe 25; the water passing out of the tank 20 through the pipe 23 having been softened by its passage downwardly through the bed of zeolite in the tank. In this movement of the water to the pipe 22 from the valve 21, the flow takes place at a normal comparatively slow rate through the port 34, rather than through the Venturi tube member 42, by reason of the substantially lower resistance to such flow through the port 34. If a very small amount of water should flow out through the Venturi tube member 42 under these conditions, such flow would not have sufficient pressure or velocity to establish a suction effect on the pipe 30.

The valve stem 45 is normally held in its elevated position, as shown in Fig. 1, for directing water outwardly through the pipe 25 whenever a faucet is opened at any point in the system of service pipes connected with said pipe 25. For assuring this result, a coil spring 52 is mounted within a cap member 53 which is secured by screw threads on the lower end of the valve 21; said spring bearing at its lower end against the end wall of the cap and at its upper end against a pin 54 carried by the stem 45 in transverse position therethrough. The spring 52 is of sufficient strength to support the stem 45 and the parts connected therewith for insuring that the parts shall normally remain in the positions shown in Fig. 1.

Means is provided for moving the valve stem 45 downwardly to the limit of its movement, as shown in Fig. 2, whenever it becomes necessary or advisable to carry out a regeneration operation for freeing the zeolite of its accumulated load of impurities taken from the water being softened. In this changed position of the parts as shown in said Fig. 2, the water entering through the pipe 24 is directed in the reverse direction through the tank 20 in preparation for the admission of salt for the regeneration effect. During this "backwash" operation, as it is called, the water passing through the softener tank is directed to the drain through the rate of flow device 28 which controls the movement of the water for obtaining the best results with the particular type of zeolite used in the softener.

With the valve set as shown in Fig. 2, the water entering the valve 21 through the pipe 24 is free to pass outwardly through the service pipe 25, in case a faucet might be opened during the regeneration operation. For regenerating the zeolite, however, the water normally passes outwardly through the port 35 and the pipe 23 to the lower end of the tank 20, such water passing upwardly through the several layers of zeolite and other associated materials in the tank 20 for return through the pipe 22 to the valve 21, from which the water escapes to the drain through the pipe 26 and the rate of flow device 28. This backwash operation is continued ordinarily for a period of six or seven minutes, after which the valve stem is moved to the intermediate position, as shown in Fig. 3.

The rate of flow control device 28, as shown in Fig. 4, comprises a perforated disc 55 made of rubber or other deformable material through the opening of which the stream of water flows for escape through the drain pipe 26. If for any reason the pressure of the water flowing through the control device 28 in a direction toward the right in Fig. 4 is increased, the deflection of the disc 55 toward the right is increased, serving to cut down the effective size of the opening through the disc. The varying pressure of the water and the inversely varying size of the opening keep the flow practically uniform. This device 28 per se forms in and of itself no part of my invention, being substantially in accordance with the showing of United States Patent No. 2,454,929, dated November 30, 1948.

With the parts in the positions shown in said Fig. 3, the water entering the valve 21 through the pipe 24 is free to pass out through the service pipe 25 if a faucet happens to be opened at that time at any point in the system connected with said pipe 25. Alternatively, and normally, such water entering the valve 21 passes out through the Venturi tube or ejector member 42 by which a suction effect is produced on the pipe 30. This suction effect causes a stream of brine to be fed from the tank 29 for movement with the water through the tubular member 43, the opening 44 and the pipe 22 into the upper end of the softener tank 20 and thence downwardly into contact with the zeolite. This feeding of water and brine to the softener tank through the pipe 22 causes a corresponding flow out of the tank through the pipe 23 to the valve 21 and thence out through the drain port 39 and the drain pipe 27. Under these conditions, the feeding of the brine into the softener tank continues until the level of the brine in the tank 29 is lowered sufficiently to cause the float 32 to drop, thereby effecting actuation of the valve 31 for terminating the upward flow of the brine through the pipe 30.

After the closure of the valve 31 for terminating the flow of brine into the tank 20, the flow of the water through the Venturi tube and thence into said softener tank continues for the full period during which the parts are maintained in the positions shown in Fig. 3; such continued flow of the water into and through the tank after the termination of the delivery of brine serves to effect the necessary rinsing by which the salt is gradually washed out of the tank. This period during which the parts are maintained in the positions shown in Fig. 3 is continued ordinarily for about an hour, at the end of which time the salt taste is normally completely eliminated from the water in the softener tank. At the end of this regeneration and rinsing period, the stem 45 is returned as hereinafter described, to the position shown in Fig. 1 for another period of effective operation of the apparatus as a water softener.

When the valve stem 45 has been returned to the position shown in Fig. 1, so as to terminate any effective tendency to create a suction effect upwardly through the pipe 30, a supply of water under pressure from the pipe 24 is caused to flow from the valve 21 downwardly through said pipe 30 to the tank 29 for replacing the brine taken out of said tank through said pipe while a suction effect upwardly was maintained in said pipe. The double acting valve 31 is effective for stopping this flow downwardly through said pipe 30 by the action of the float 32 when the water has been brought back to its normal level in said tank 29.

It may be noted that in the flow of the salt solution into the tank 20, such solution passes directly from the housings 41 and 33 into the pipe 22 for delivery to said tank 20 without passing into the interior of the valve 21 and without coming into contact with any of the disc valves on the valve stem 45. When later the salt solution is being carried out of the tank 20, with the parts in the positions shown in Fig. 3, such solution flows into the valve 21 through the pipe 23 and the port 35 and thence out through the drain port 39, it being brought into contact with the valve discs 49 and 50. Under such circumstances, however, the salt solution is in a very diluted condition, as compared with the strength as delivered through the pipe 30 for entrance into the softener tank 20. The salt solution is thus prevented from having any materially damaging effect on any operating portions of the metallic structure of the apparatus.

In the preferred form of my invention, as illustrated in the drawings, the valve stem 45 is moved to its successive operating positions, against the action of the spring 52, by the pressure of a stream of water on the top face of the valve disc 46. For this purpose, water under pressure is fed to the upper end of the valve 21 through a pipe 56 connected through a cap 57 to said valve. In the pipe 56 there is interposed a stop and waste valve 58 of any approved type controlled and operated by a time limit switch mechanism 59 of any approved type, shown diagrammatically in Figs. 2 and 5, for opening and closing the valve at timed intervals. This mechanism 59 is electrically operated by current from a circuit 60, and is actuated for starting a predetermined cycle of operations by a temporary closure of a switch 61 in an electrical circuit 62. The switch 61 may be located at any desired point for convenient actuation.

The arrangement is such that when the switch is closed momentarily, the time limit switch mechanism 59 causes the valve 58 to be opened and closed a plurality of times at predetermined timed intervals following such manual closure of said switch 61. When the valve 58 is opened at the start of such a cycle of operations, the valve stem 45 is moved downwardly to the limit of its motion by the pressure of the water in the pipe 56 against the action of the spring 52. When the valve 58 thereafter is closed by the action of said time limit switch mechanism, the spring 52 serves to give the stem 45 a return movement upwardly, the stop and waste valve 58 being conditioned by its closure for permitting the escape of the water ahead of the valve disc 46.

In the arrangement as shown and described, the spring 52 normally holds the valve stem 45 in its uppermost position, as shown in Fig. 1, with the valve 58 closed, and the pressure of the water entering through the pipe 56 with the valve 58 open normally hold the valve stem in its lowermost position, as shown in Fig. 2. For holding the valve stem at an intermediate position, I have provided a slidingly mounted member connected so as to move with the valve stem and cooperating with a shell member and a detent rotatably mounted thereon, as hereinafter described, the shell member being supported by the cap 53 at the lower end of the valve 21, with the spring 52 mounted about the shell so as to yield downwardly at its upper end portion with respect to the shell member. This holding device forms in and of itself no part of my invention, but it is illustrated in considerable detail for expediting a description of its operation and effect.

As is illustrated in Figs. 6 and 11, the slidingly mounted member is in the form of a flattened tube 63 open along one face and secured to the valve stem 45 by the pin 54 above referred to; such member 63 having an easy working fit within the shell member which also is in the form of a flattened tube 64 open along one face thereof. As is best shown in Fig. 11, the pin 54 extends through a long vertically positioned slot 65 in the wall of the tubular member 64 for permitting the pin and the tubular member 63 to have free movement vertically within the shell.

At a suitable point on the shell member 64, a double-ended detent 66 is rotatably mounted in position, having a substantially right angled notch 67 formed in each end. On the inner face of the slidably mounted member 63, a lug 68 is mounted rigidly in position for engagement with the detent 66 for turning it into adjusted position with respect to the tubular members 63 and 64 and for holding the detent in the desired adjusted position under some conditions. For permitting the detent to rotate to the necessary extent, the wall portions of said tubular members 63 and 64 are provided with slots 69 and 70 respectively therein.

With the parts in the positions as shown in Figs. 1 and 7, the detent 66 is held in position with one of the notches 67 open directly toward the lug 68. When the valve 58 then is opened for forcing the valve stem 45 downwardly into its predetermined second position corresponding to Fig. 2, the lug 68 engages one of the obliquely positioned faces defining the notch 67, causing the detent to turn into oblique position as shown in Fig. 8, with a portion of the detent extending outwardly through the slots 69 and 70. The parts are held preferably in this predetermined second or backwash position for a period of about six or seven minutes by the continued pressure of the water through the pipe 56, at the end of which period the pressure through said pipe 56 is relieved by the closure of the valve 58 so as to permit the spring 52 to move the tubular member 63 and the valve 45 upwardly. In the course of this upward movement of the tubular member 63, the lower end of the slot 69 in the wall of said tubular member 63 engages the protruding portion of the detent and turns the detent in counterclockwise direction, as viewed in Figs. 8 and 9, until the detent is brought into engagement with the wall of such tubular member at a point below the slot 69, thus serving to stop the rotation of the detent and also to stop the upward movement of said tubular member 63 and the valve stem 45, with the parts in the positions shown in Fig. 9 and the corresponding predetermined third position, as shown in Fig. 3. In these positions of the parts, the salt solution and the rinse water are fed through the valve 21 and into the softener tank 20, the parts being normally held in such positions for a period of about an hour for insuring effective regeneration and effective rinsing for clearing out the salt after the completion of the regeneration step.

When the valve stem 45 and the associated parts are to be given an upward movement again to their normal first or operative water softening positions, as shown in Fig. 1, the valve 58 is momentarily opened for permitting again the passage of water under pressure through the pipe 56 for forcing the valve stem downwardly. In the course of this downward movement of the tubular member 63, the lug 68 engages the side face of the detent, serving to rotate the detent further in a counterclockwise direction, as viewed in Figs. 9 and 10, into the position shown in Fig. 10, after which the stop and waste valve 58 is again closed so as to permit the spring 52 to force the valve stem 45 upwardly. In this upward movement of the tubular member 63, the lower end of the slot 69 engages the bottom side face of the detent so as to turn the detent further in a counterclockwise direction, as viewed in said Fig. 10, to the position shown in Fig. 7, thus permitting the valve stem 45 and its associated parts to return to their uppermost or predetermined first position, shown in Fig. 1, for normal water softening operation.

In my disclosed apparatus, the arrangement of the valve discs on the valve stem and the arrangement of the several ports opening from the interior of the main control valve are such that when the parts stand in the predetermined first position the apparatus is effective for a water softening operation, that when the parts are moved to a predetermined second position water is adapted to flow through the softener tank in the reverse direction from that in which the water flows during the water softening operation, and that when the parts are moved to a predetermined third position a selected amount of salt solution is fed into the softener tank, after which there is a continued flow of water through the softener tank for a sufficient period for washing the salt solution out of the tank. My apparatus is highly efficient in use and is simple in construction and its durability is outstanding by reason of its control of the salt for regeneration without the passage of such salt through the critically fitted valve parts of the apparatus.

Whenever for any reason it might be desirable to remove the valve stem 45 and the parts connected therewith from the housing of the valve 21, this can be effected very quickly and easily by the removal of the cap 53 from its operative position on the lower end of the housing. The construction is such that with the cap 53 released from the housing the valve stem can be slid downwardly out of position in the valve housing.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A valve comprising a valve housing having a bore, first and second passages leading from axially spaced regions of the bore for connection with the inlet and outlet of a water softener and the following passages leading from the bore at regions located successively between the first passage and the second passage: a restricted Venturi passage leading to the first passage at a region outward of the bore, a third passage adapted to connect the restricted Venturi passage to a source of brine, a passage for raw water, and a passage for softened water; a spool valve disposed in the bore and having a plurality of axially spaced openings therethrough, and means for moving the valve axially in the bore to assume a first extreme position in which one of said axially spaced openings connects the first passage with the raw water passage, another axially spaced opening connects the second passage with the softened water passage and provides a block between the raw water passage and the softened water passage, a second extreme position in which an axially spaced opening in the valve connects the raw water passage with the softened water passage and with the second passage and provides a block between the raw water passage and the first passage and the restricted Venturi passage, and a third position intermediate the first and second extreme positions in which an axially spaced opening connects the raw water passage with the restricted Venturi passage and with the softened water passage and provides a block between the raw water passage and the first passage, and a block between the softened water passage and the second passage.

2. In combination a valve comprising a valve housing having a bore and passages leading from different axially spaced regions of the bore and connectable with opposite ends of a water softener, a raw water inlet, a soft water outlet, and a Venturi connected to a brine source and opening into the water softener; and a valve part mounted in the bore in the valve housing and having axially spaced openings therethrough, said valve part being axially movable in the bore to a first extreme position in which water is caused to go from the inlet, through an opening in the valve part, through the water softener, and then through a second opening to the outlet, a second position in which water is caused to go from the inlet through an opening in the valve part to the outlet and also through the water softener in reversed direction and then through another opening in the valve part to the drain, and to a third position in which water is caused to go from the inlet through an opening in the valve part to the outlet and through said last-mentioned opening in the original direction through the water softener and through the passage containing the Venturi so that brine is mixed therewith and thence through the second opening in said valve part to the drain; and means for controlling the positioning of the valve part in its three axial positions, said means comprising resilient pressure means operable upon one end of the valve part for moving said part axially to its first said position, fluid pressure operated means disposed at the end of the valve part opposite the resilient pressure means and adapted to act in opposition thereto, means for supplying fluid under pressure to said fluid pressure operated means to move said part to its second position against the action of said first mentioned pressure means, a detent member secured to the housing and means on the valve part adapted to contact said detent member when said valve part is shifted from the first position to the second position to block complete return of the said valve part to the first position by said first named pressure means and thus to determine the said third position of said valve part.

3. A valve as specified in claim 1, the valve housing having first and second drains leading from regions of the bore on the sides of the first passage and the second passage away from the second passage and the first passage, respectively, the spool valve part in its first extreme position providing a block between the first passage and the first drain and between the second passage and the second drain, in its second extreme position connecting the first passage with the first drain and providing a block between the second passage and the second drain, and in its third intermediate position providing a block between the first passage and the first drain and connecting the second passage with the second drain.

4. A combination comprising the valve specified in claim 1 and means for controlling the positioning of the valve part in its three positions, said means comprising pressure means for moving the part to its first position, means for supplying fluid under pressure to the part to move it to its second position against the action of said first-named pressure means, and a detent member angularly movable by shift of the part from the first position to the second position to block complete return of the part to the first position by said first-named pressure means and thus to determine the third position.

5. Water softener apparatus as specified in claim 1, in which the valve housing has a drain, said spool valve having an opening which connects the drain with said first passage when the spool valve is in its intermediate position, and in which a rate of flow control means is connectible with said drain through which the water escapes for maintaining the flow constant regardless of varying pressure conditions in connection with such flow.

6. A combination comprising the valve specified in claim 3 and means for controlling the positioning of the valve part in its three positions, said means comprising stops preventing the part from going beyond its first and second positions, pressure means for urging the part to its first position, and a detent movable by shifting of the part from the first to the second position to block complete return of the part by said pressure means from the second to the first position and thus to determine the third position.

7. A combination comprising the valve specified in claim 3 and means for controlling the positioning of the valve part in its three positions, said means comprising stops preventing the part from going beyond its first and second positions, pressure means for urging the part to its first position, and a detent having recesses at its ends and being angularly movable by engagement of the part with the recess at one end upon shift of the part from the first position to the second position so as to block complete return of the part to the first position by engagement of the part with the recess at the other end and thus to determine the third position.

References Cited in the file of this patent
UNITED STATES PATENTS

| | | |
|---|---|---|
| 1,890,847 | Flory | Dec. 13, 1932 |
| 2,050,966 | Eisenhauer | Aug. 11, 1936 |
| 2,137,406 | Johnson | Nov. 22, 1938 |
| 2,396,809 | Addison | Mar. 19, 1946 |
| 2,506,711 | Evans | May 9, 1950 |
| 2,539,748 | Mueller | Jan. 30, 1951 |
| 2,553,458 | Jordan | May 15, 1951 |
| 2,571,000 | Albertson | Oct. 9, 1951 |
| 2,620,299 | Deters et al. | Dec. 2, 1952 |
| 2,670,328 | Webb | Feb. 23, 1954 |